United States Patent [19]
Brichta

[11] 3,754,622

[45] Aug. 28, 1973

[54] METHOD AND APPARATUS FOR LUBRICATING ROTATING BEARINGS

[75] Inventor: Franz Brichta, Weilmodrof, Germany

[73] Assignee: SKF Kugellagerfabriken GmbH, Schweinfurt, Ernst-Sachs-Str., Germany

[22] Filed: Mar. 23, 1971

[21] Appl. No.: 127,141

[30] Foreign Application Priority Data
Mar. 24, 1970 Japan.................................. 45/27526

[52] U.S. Cl.................................. 184/1 D, 118/50
[51] Int. Cl.............................................. F16n 3/00
[58] Field of Search............... 184/1 R, 1 D, 105 R; 118/408, 50, 51

[56] References Cited
UNITED STATES PATENTS

| | | | |
|---|---|---|---|
| 2,489,809 | 11/1949 | Owens | 184/1 D |
| 2,309,820 | 2/1943 | Berg | 184/1 D |
| 2,891,634 | 6/1959 | Becker | 184/1 D |
| 3,611,985 | 10/1971 | Juday | 118/50 |

FOREIGN PATENTS OR APPLICATIONS

| | | | |
|---|---|---|---|
| 742,730 | 1/1944 | Germany | 184/1 D |
| 906,794 | 5/1945 | France | 184/1 D |

*Primary Examiner*—Manuel A. Antonakas
*Attorney*—Richard Low and Murray Schaffer

[57] ABSTRACT

Method and apparatus for lubricating rotating bearing shafts. The lubricant is pumped under pressure into a first opening in the bearing housing located in front of the shaft bearing, until the lubricant reaches a second opening located behind the shaft bearing. Subsequently the lubricant is removed under suction.

14 Claims, 1 Drawing Figure

Patented Aug. 28, 1973
3,754,622
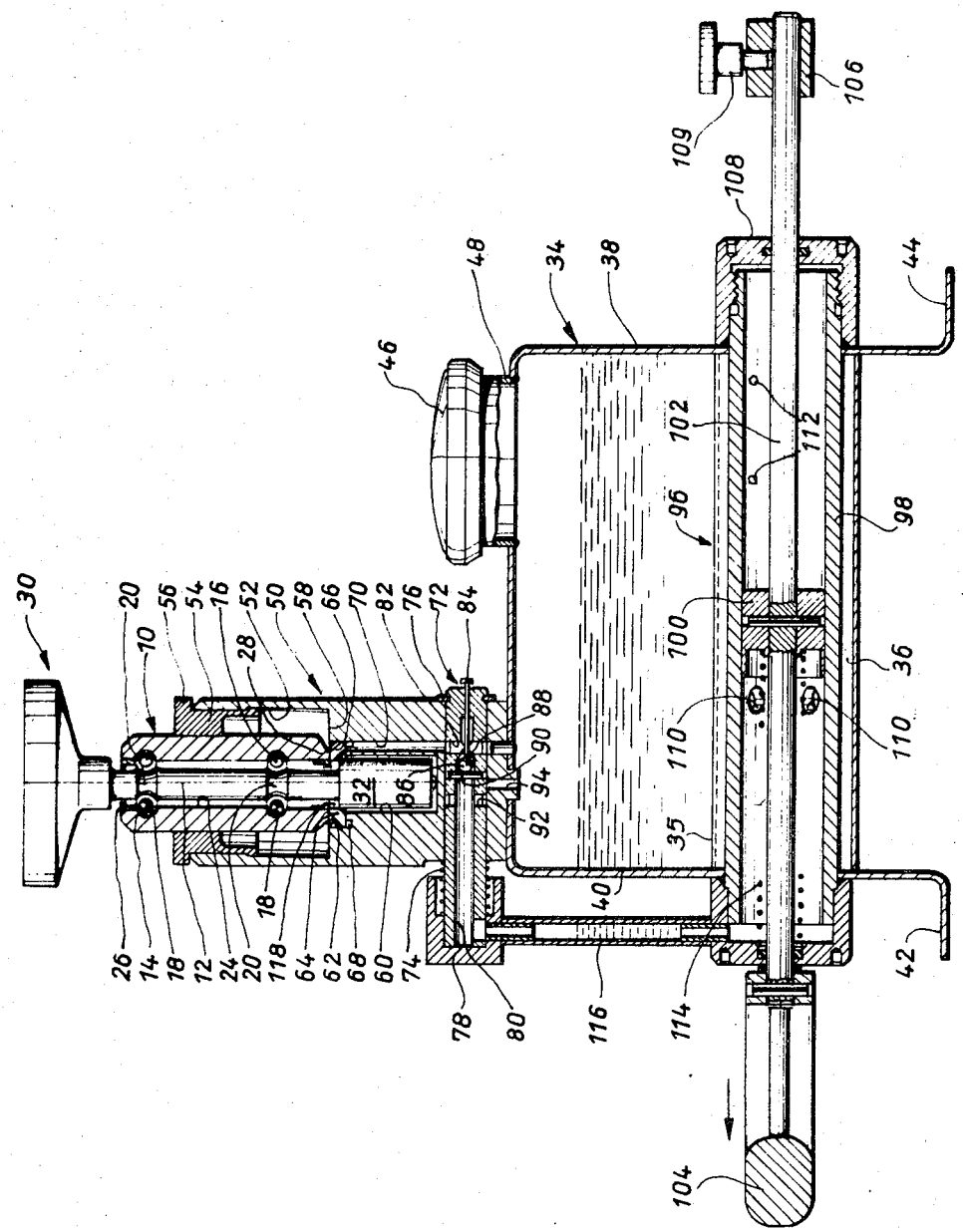
FRANZ BRICHTA
*INVENTOR.*

METHOD AND APPARATUS FOR LUBRICATING ROTATING BEARINGS

BACKGROUND OF INVENTION

The present invention relates to a method of lubricating rotatably journalled shaft bearings mounted in a bearing housing and to the apparatus for performing such lubrication particularly on bearing shafts used to rotate spinnerette or spinning rotors.

The present invention is particularly advantageous for supplemental lubrication of the drive shaft on bearing units for spinning rotors where both ends of the shaft project from a bearing housing which receives them. The shaft carries at one end the spinning rotor and at the other end the drive whorl pulley means or other means by which the rotor is spun. Such spinning rotor bearing units were originally designed in such a manner that it was impossible to provide supplemental lubrication. The possibility of supplemental lubrication had been forgone, on the assumption that a very long life for such bearing units was not to be normally expected because of the very high rotary speeds of the spinning rotors of the drive shaft and because of the specific shape of the shaft bearing. In the meantime, it has been found the high precision with which such bearing units are manufactured permit them to run perfectly well over an extended period even if the lubricant inserted during the manufacture of the bearing ages and thus becomes useless or spent.

Spinning manufacturing plants have recently employed the rotor spinning process on a large scale and correspondingly high numbers of such bearing units have been bought by spinning plants. Long useful life of such spinning units thus presented the problem of finding ways of supplementing the lubrication.

It is therefore an object of the present invention to provide an advantageous and useful means for supplemental lubrication of spinning rotor bearing units.

It had been known that in order to keep the operating temperature of high speed rotating shafts at the lowest possible value and to insure optimum running properties at extended periods supplement lubrication of the bearing at predetermined intervals with a relatively small amount of lubricating material had to be provided. This manner of supplement lubrication has the disadvantage that certain amounts of old lubricant and also contaminants remain in the bearing of the shafts and it is therefore not possible to maintain substantially uniform lubricating conditions over the long run. This is drawback particularly significant when annular gaps are formed where the shaft exits from the bearing housing. The gap separating the two parts provides a space through which contaminants may enter into the bearing from the outside. Such cantaminants have a most harmful effect on the useful life of ball bearing supports for the shaft in particular.

It is therefore among the objects of the present invention to provide an improved supplemental lubrication system for the bearings of the type described which overcome the drawbacks of the prior art and to provide lubrication in such a manner that purification of shaft bearing occurs simultaneously with the formation of a uniform lubricating film over the entire bearing.

The above mentioned objects as well as others together with numerous advantages will be seen from the following disclosure of the present invention.

SUMMARY OF INVENTION

According to the present invention a method for lubricating rotating bearing shafts is provided wherein the lubricant is forced under pressure into a first opening in a bearing housing, located in front of the shaft bearing until the lubricant reaches a second opening which is located behind the shaft bearing and subsequently removing the lubricant under suction from the bearing housing.

The present invention further provides apparatus comprising a lubricating head having a connecting opening automatically sealed in an outward direction and which is capable of being connected with the housing opening receiving the bearings, for entrance or discharge of lubricants. The outwardly sealed chamber constituted by the connecting opening and the bearing body is connected with a pumping and suction device by means of which a defined amount of lubricant may be forced into the bearing housing and subsequently exhausted from the same.

BRIEF DESCRIPTION OF DRAWINGS

In the accompanying drawing the structural details of the lubricating device of the present invention is shown applied to a conventional bearing unit for spinning rotors. The single FIGURE is shown in side elevation and is partially sectioned.

DESCRIPTION OF INVENTION

As seen in the figure the conventional bearing unit comprises a bearing housing 10 in the form of a hollow cylinder 22 in which a drive shaft 12 is rotatably journalled. The shaft 12 is held by a pair of ball bearing supports 14 and 16 which are each seated in an outer groove 18 ground into the inner circumferential wall of the housing 10 and in an inner groove 20 ground into the outer circumference of the drive shaft 12. The drive shaft 12 extends outwardly of a central opening or bore 24 at both ends. Seal bushings 26 and 28 are provided at each end of the bore 24 respectively. A narrow gap is left between the bushing 26 and 28 and the drive shaft 12 for entry of lubricant. Attached for conjoint rotation to the upper end of the drive shaft 12 is a conventional spinning rotor 30 in which is defined a spinning chamber for twisting fibers. A drive whorl 32 is secured at the lower end of the drive shaft 12. The whorl is of conventional structure and is adapted to rotate the shaft and rotor at high speed.

According to the present invention a substantially prism shaped container or lubricant reservoir 34 is provided. The lubricant is a dispersion of heavy grease and a lighter more volatile liquid solvent such as the conventional hydrocarbon solvents. The reservoir has an enlarged bottom 35 provided with a depressed portion 36. The front and rear faces 38, 49 respectively of the container 34 extend below the enlarged bottom 35 and portion 36 to form legs 42 and 43 by which the apparatus is supported in stable condition. An inlet spout 48 is provided on the upper surface of the container and is supplied with a cover 46. Also supported on the upper surface of the container 34 is a lubricating head 50 which surrounds and receives the bearing units 10. The lubricating head 50 provides the means for lubricating the units 10 as described above.

The lubricating head 50 comprises a housing preferably symmetrical about a rotational axis. The head is provided with a series of coaxial central bores, the upper one of which as seen in the drawing, constitutes a recess 52 of greatest diameter. A support or guide bushing 54 for holding the bearing unit 10 is received in the recess 52. The guide bushing 54 is made of resiliently yieldable material having one or more slots, and has a flange 56 which rests on the upper annular edge of the lubricating head 10. The recess 52 has a bottom 58 forming a shoulder from which there extends a second recess 60 in which the drive whorl 32 is received. Inserted in a suitable groove along the bottom 58 is sealing ring 62 which also is made from resiliently yieldable material. The sealing ring 62 has, for example, two diametrically opposed feed conduits 64, 66 which are directed obliquely inward from the lower end of the lubricating head, as seen in the figure. The conduits 64 and 66 communicate with an annular channel 68 formed in the lower face of the sealing ring 62. A depending connecting duct 70 leads through the lubricating head 50 from the annular channel 68 to a slide valve 72.

The slide valve 72 is located in a bore arranged at right angles to the longitudinal axis of the bearing unit. A compression spring 74 surrounds the slide 72 and biases the slide to the right as seen in the drawing. The slide 72 has a circular cross section and is provided with a fixed abutment ring 76 at its front end which determines its leftward movement by abutment with the wall of the head 50. The slide 72 is provided with an abutment head 78 at its rear end to which it is securely fixed and which likewise defines its movement but here, to the right as seen in the drawing, by engaging the opposite wall of the head 50. The spring 74 abuts between the abutment head 78 and the head 50 so as to normally bias the slide 72 to the left.

The slide 72 is provided with a longitudinal central duct 80 which extends from the rear-most end of the slide 72 (adjacent the abutment head 78) to a transverse channel 82 which is aligned with the depending conduit 70 when the slide is in the normally biased position. The transverse channel 82 is at a right angle to the longitudinal duct 80 and extends through the diameter of the slide so as to communicate with duct 70 when the abutment ring 76 is flush against the wall of head 50. At the intersection of the duct 80 and the channel 82 there is provided a check or throttling valve comprising a ball 86 seated in a conical surface 88. The ball is smaller than the conical surface providing an annular gap therebetween and its position therein is regulated by an elongated adjustment screw 84. The cross section of the annular gap is enlarged or reduced according to the adjustment of the screw 84. The ball 86 is limited in its movement by the screw 84 and pin 90 which are diametrically arranged transversly through the duct 80.

A second transverse channel 92 is provided in the slide 72. The second channel 92 is parallel to the first channel 82 but is axially spaced therefrom toward the rear or toward the abutment head 78. The second transverse channel is located so that if the slide 72 is moved to the extreme right it is aligned with an outlet port 94 formed in the lubricating head 50. This outlet port communicates with the container reservoir 34. As will be obvious the slide 72 is reciprocable between two positions, the first where channel 82 aligns with conduit 70 (the ring 76 abuts against the head); the second where channel 92 aligns with the outlet port 94 (the head 78 abuts against the head.) In the latter position the communication between channel 82 and conduit 70 is interrupted.

The storage reservoir 34 is provided with a dual pumping and suction device 96 which is horizontally arranged in the bottom portion 36 to extend outward of the front and rear walls 38 and 40. The device comprises a cylinder 98 in which a piston 100 is located. The piston 100 has a rod 102 extending outwardly of the cylinder 98 at both ends. The piston is manually operated and has a handle 104 which is fastened at the rear end. At the other end of the piston rod a block 106 is mounted and secured by means of a thumb or set screw 109. The block 106 is adjustable along the length of the rod 102 and is adapted to engage the end 108 of the cylinder.

The interior of the cylinder 98 is connected, for lubricant communication, with the reservoir 34 by means of holes or ports 110 and 112 formed in the periphery of the cylinder 98. A compression spring 114 is arranged between the rearward face of the piston 100 and the inner face of the rear end of the cylinder 98. The spring 114 urges the piston 100 into the initial operating position as seen in the drawing. A flexible connecting hose 116 connects the cylinder interior chamber at the rearward end (or handle end) with the longitudinal duct 80 formed in the slide 72.

The aforementioned apparatus operates in the following manner:

A plurality of bearing units are individually inserted into the upper recess 52 of the lubricating head, with their lowermost edges resting on the sealing ring 62 secured in the shoulder formed by the bottom surface 58. The drive whorl 32 is received in the lower recess 60. The sealing ring 62 sealingly engages the circumference of the whorl. An annular space 118 is thus defined between the bearing housing cylinder 22 and the whorl 32 by the location of the sealing ring 62 and the flanged bushing 28. The feed channels 64 and 66 terminate in the annular space 118. The annular space 118 is thus connected with the space surrounding the shaft 12 and the ball bearing supports 14 and 16, by the spaced gap provided by the flanged bushing 28. Lubricant can thus pass from the conduit 70 through the oblique feeding channels 64 and 66, the annular space 118 and into the central opening 24 surrounding the shaft 120.

When it is desired to provide supplemental lubrication for the bearing unit it is necessary to first mix the lubricant dispersion present in the reservoir. This is accomplished in a simple manner by moving the valve slide 72 to the right as viewed in the drawing so that the second transverse channel 92 and the outlet port 94 is aligned. The piston 100 is then operated by means of the handle 104 and the lubricant dispersion is pumped by way of the connecting hose 116 into the duct 80 of the slide 72 where it then returns through channels 92 and 94 to the reservoir 34. Thus the lubricant moves in a closed circuit and is forced to mix with the volatile liquid. As soon as the abutment head 78 of the slide 72 is released the slide automatically (under urging of spring 74) assumes the lubricating or operating position shown in the drawing. When this occurs communication between the duct 80 and the depending conduit 70, by way of the transverse channel 82 is provided. Thus on pumping of lubricant from the reservoir by unit 96, lubricant can move to duct 80, thence to conduit 70, to space 118 and opening 24 as previously described.

The abutment block 106 may be fixed in such a position that the amount of lubricant which is forced into the bearing unit by operating the handle 104 is such as may be efficiently received in the bearing unit and until the lubricant exits from the gap between the upper bushing 26 and the shaft 12. Thus the apparatus may be varied to conform to use with different bearing units. After the lubricant has been fed to the bearing unit and the handle 104 is released the piston is automatically returned to the ready position by action of the compression spring 104. The lubricant being withdrawn from the bearing unit by the suction action of the pump-suction device 96. A lubricating film, however, remains within the bearing housing. After evaporation of the volatile liquid a thin lubricating film remains on the bearing surfaces.

A complete lubrication of the bearing occurs as the lubricant is forced through the annular gap present on the side of the whorl between the frontal face of the bearing housing and the drive shaft until the lubricant reaches the annular gap present at the opposite frontal face of the bearing housing.

During the pumping portion of the cyclic operation lubricant initially spreads uniformly into all the spaces of the bearing and quickly and easily displaces and dislodges old lubricant and residual contaminants from the functional zones of the bearing. Subsequently, during the withdrawal cycle of the entire shaft bearing is rinsed with lubricant and particles of contaminants and old lubricant are purged from the housing and only a thin film of lubricant remains on the bearing surfaces. Particularly good lubrication of bearing units having grooved ball bearing seats provided in the bearing housing is obtained. Normally such grooves gradually become clogged from the high concentration of lint in the atmosphere. The rinsing action on the bearings achieved by the method and apparatus of the present invention effectively cleanses the bearing during each pumping.

It is possible to use, for example, suitable lubricating oils of low viscosity. The method, however, is employed to particular advantage when a grease of relatively high viscosity is used as lubricant, the grease being dispersed in a volatile solvent liquid carrier. During lubrication of the shaft by means of such grease dispersion, all parts pertaining to the bearing are uniformly enveloped so that a thin grease or lubricant film remains after the solvent liquid of the grease dispersion has become volatilized. Prior to forcing grease dispersion through the bearing housing the present apparatus provides that the dispersion is thoroughly mixed in order to insure uniform lubricant concentration and viscosity. The choice of grease or oil and the solvent (such as for example a hydrocarbon solvent) will be readily apparent to those skilled in this art. The mixing ratio of the grease dispersion is, however, to be such that the lubricant when applied is in a very fluid condition so that rinsing of the bearings may occur very rapidly.

Because spinning machines normally employ 200 or more bearing units the present invention permits the lubricant to be fed to the bearing housing in dosing amounts of predetermined levels of pressure so that the supplemental lubrication of the bearing housing can be achieved in the shortest possible time.

Depending on the kind and arrangement of the shaft bearing, a single insertion of lubricant under pressure and its withdrawal is generally sufficient for cleaning and supplemental lubrication. If the bearing units are installed in particularly dirty surroundings, it may be preferred to rinse the bearing several times.

The present invention is applicable to all known types of bearings, particularly sleeve bearings and antifriction bearings. For these purposes the conventional bearing housing may be provided at the circumference with openings which may be closed by removable sealing means such as closing screws, one of the openings serving for supplying and the other for withdrawal of the lubricant.

Because the apparatus can be arranged for manual operation, a particular simple construction is achieved with the pumping and suction device. The cylinder of this device communicates directly with the lubricant storage reservoir. The amount of lubricant which is to be fed to each bearing is easily adjusted to obtain the desired dosage by the abutment block mounted on the end portion of the piston rod remote from the handle. The abutment block is arranged to be adjusted and fixed in any desired position on the piston rod. Thus by means of the abutment block, the piston stroke for feeding a predetermined amount of lubricant may be predetermined and set.

According to the present invention, the piston of the pump and suction device is adjusted against the effect of the power reservoir created by the compression spring so that the piston automatically performs the suction movement by which the lubricant is withdrawn from the bearing housing. An advantageous design is achieved by locating the cylinder to pass through the lubricant container so that the inlet and outlet ports of pumping and suction cylinder is in the same connection provided by openings directly in the cylinder wall.

These connecting openings may be covered by a filter of suitable design in order to avoid contaminants withdrawn from the reservoir from being fed to the bearings. On the other hand the apparatus may also be constructed with a filter in the connecting hose to prevent the lubricant which is withdrawn from the bearing housing from flowing back into the lubricant container.

The adjustable throttling or ball check by which the flow of lubricant through the slide from the cylinder to the opening of the lubricating head advantageously controlls the exact amount of lubricant delivered to the bearing. By varying the position of the set screw the amount of fluid is varied.

When lubricant dispersions stand still, the lubricant constituent of the dispersion normally settles in the volatile liquid. The provision of the slide valve permits intensive mixing of the lubricant dispersion prior to starting operation of the apparatus. Even though the same pumping and suction device is used flow of lubricant is diverted into the lubricant container by means of the valve 92 before it reaches the throttling valve channel 2 by simply shifting the slide.

The lubricating head as such may be of any desired form, however, if the apparatus is to be used on bearing units for spinning rotors, the arrangement should preferably be made in such a manner that the bearing units may be serially lubricated quickly one after the other. This is possible in the present apparatus by inserting the bearing unit into the lubricating head in such a manner that lubricant dispersion may be fed into the respective bearing housing from the side of the whorl. The inner annular shoulder 58 provided within the recess of the lubricating head advantageously receives the bearing housing and closely envelopes the same. The frontal face of the bearing housing on the whorl side may abut against the shoulder for support. However, the several orifices of lubricant ducts located on the internal circumference of the shoulder permit free flow of lubricant which may be fed through the zone between the bearing housing and the drive whorl.

The lubricant is fed to the conduits in the annular shoulder in relatively simple manner by forming the shoulder of a resilient sealing ring whose frontal face, directed away from the bearing housing, is secured to an annular groove formed by the shoulder and with the pumping and suction unit and at least one duct of the annular shoulder having an orifice in the annular groove. According to another development of the invention the interchangeable sealing sleeve envelopes the bearing housing of the inserted bearing unit and seals the same in an outward direction. This makes it possible to employ bearing housings of different sizes.

Ultimately, it is advantageous that the lubricating head and the reservoir form a unitary structure, the lubricating head is preferably mounted on the lubricating reservoir so that the lubricant moves from below in an upward direction on pumping.

Various modifications have been suggested, others will be obvious to those skilled in this art. The present disclosure is therefore to be taken as illustrative only and not limiting of the invention.

What is claimed

1. The method for lubrication of the drive shaft of bearing units for spinning rotors, having a bearing housing adapted to journal a shaft therein, the shaft projecting with both ends from the bearing housing and carrying a spinning rotor at one end and the drive whorl at the other end, said drive shaft defining with said housing a first annular gap on the side of the whorl and the frontal face of the bearing housing and a second annular gap at the opposite face of the bearing housing, the method comprising the steps of pumping the lubricant into the first annular gap through said housing, until the lubricant reaches the second annular gap and subsequently withdrawing said lubricant under suction from the bearing housing.

2. Method according to claim 1 including the step of feeding the lubricant through the bearing housing in predetermined dosing amounts.

3. Apparatus for lubricating a rotating drive shaft of a bearing unit comprising a bearing housing, a shaft extending axially outwardly therefrom at each of its frontal ends, and bearing means for rotatably supporting said shaft within said housing, said housing and said shaft defining an annular gap at each of the frontal ends of said housing, a common lubricating head having an axial recess in which said bearing housing is received, means for sealing said bearing housing within said recess and providing a closed chamber surrounding said bearing housing, a source of lubricant, a pumping and suction device communicating with said source and conduit means for connecting said pumping and suction device to said chamber, and means for conducting lubricant from said chamber into said bearing housing, through one of said annular gaps said pumping device being adapted to deliver a predetermined amount of lubricant to said chamber to pass axially into said bearing housing and said suction device being adapted to withdraw the lubricant from the chamber after said bearing housing is filled.

4. Apparatus according to claim 3 characterized in that the pumping and suction device comprises a cylinder communicating directly with said source of lubricant, a piston arranged in said cylinder a rod extending outwardly of said cylinder and having a handle for manual operation in pumping and suction strokes.

5. The apparatus according to claim 4 including adjustable stop means located on said rod whereby the stroke of said piston may be varied to provide a predetermined selected lubricant dose.

6. The apparatus according to claim 5 including spring means for normally urging said piston in the suction stroke.

7. The apparatus according to claim 6 wherein said source of lubricant is contained in a reservoir, and said cylinder extends horizontally through said reservoir and is provided with inlet/outlet ports on either side of said piston communicating with said reservoir, the stop means being located on the piston rod to abut against one end of the cylinder, and the spring abutting against the other end.

8. The apparatus according to claim 3 including an adjustable throttle valve interposed between the pumping and suction device by which lubricant can be delivered to said chamber in controlled amounts.

9. The apparatus according to claim 3 including bypass valve interposed between said pumping and suction device and said chamber for diverting lubricant before delivering to said chamber.

10. Apparatus according to claim 8 wherein said lubricating head comprises an enlarged body having an annular shoulder for receiving the frontal end of a plurality of said bearing housings and a recess situated below the chamber to receive a portion of the respective bearing units mounted in said bodies, said head having at least one orifice extending through said shoulder at an angle to the longitudinal axis of each of said housings through which the lubricant may be fed to each.

11. The apparatus according to claim 10 including a sealing ring located at said shoulder, said sealing ring being provided with said orifices, and an annular channel communicating with said throttling valve.

12. The apparatus according to claim 11 wherein said sealing means for said bearing housing is a resiliently yieldable member securing said housing at the front end of said lubricating head.

13. The apparatus according to claim 10 wherein said container reservoir and said lubricating head are formed in unitary manner.

14. The apparatus according to claim 8 wherein said throttling valve comprises a slide member, having a central duct, and a pair of parallel diametrical channels extending through said duct, said slide being movable between two positions providing communication of said channels with said chamber and said reservoir respectively.

* * * * *